July 24, 1923.

H. L. SCHNEIDER

1,463,097

POWER DRIVE UNIT FOR AGRICULTURAL IMPLEMENTS

Filed Feb. 11, 1922      4 Sheets-Sheet 1

Inventor
Herman L. Schneider

July 24, 1923.

H. L. SCHNEIDER

POWER DRIVE UNIT FOR AGRICULTURAL IMPLEMENTS

Filed Feb. 11, 1922

Inventor
Herman L. Schneider
By Churdahl Parker & Carlson
Attys

Patented July 24, 1923.

1,463,097

UNITED STATES PATENT OFFICE.

HERMAN L. SCHNEIDER, OF GLEN ULLIN, NORTH DAKOTA, ASSIGNOR OF ONE-HALF TO LENA MILLER, OF CHICAGO, ILLINOIS.

POWER DRIVE UNIT FOR AGRICULTURAL IMPLEMENTS.

Application filed February 11, 1922. Serial No. 535,762.

*To all whom it may concern:*

Be it known that I, HERMAN L. SCHNEIDER, a citizen of the United States, residing at Glen Ullin, in the county of Morton and State of North Dakota, have invented certain new and useful Improvements in Power Drive Units for Agricultural Implements, of which the following is a specification.

This invention relates to a power drive unit for agricultural implements designed especially for operating headers, binders and other push operated implements, and suitable for use as a tractor hitch to draw plows, harrows and the like.

In the operation of headers and similar harvesting implements, it has in the past been the practice to employ tractor hitches running in front of the implement or draft animals hitched to the steering pole or tongue of the implement. In either event the steering was usually done by a trailing steering wheel guided by the operator by means of a tiller lever operated in between his legs. This proved impractical and was very tedious, especially when running over uneven or boggy fields. Furthermore, because of the manner of hitching, it was impracticable to negotiate anything but a gradual turn. It was, therefore, necessary to go through considerable maneuvering to turn a sharp corner to bring the implement in line to cut the next swath, as for example at a corner of the field. Such operations resulted inevitably in loss of time and frequently damage to standing grain, or cut grain which may have been left in bunches in the field to cure before gathering. The principal object of the present invention is to provide a device to replace the manually guided trailing steering wheel of the implement with a power operated wheel of a pusher unit capable of quick and easy control, operated from behind the implement to guide the latter along a straight course, and which may be operated to move forward and backward in steering the implement into position to cut another swath at a corner of the field; the arrangement being such as to permit of the latter operations being performed in an exceedingly limited space and without damage to standing grain, or cut grain lying in the field.

Another object of the invention lies in the provision of a power drive unit of the kind mentioned which is readily detachable from one form of implement to be coupled to another, so that it is available for use both in harvesting crops and in preparing the soil. For this purpose, I provide the unit with a pair of drive wheels arranged to operate side by side and be driven as a single bull wheel upon which the unit may be swivelled as when operating as a pusher for headers, binders and the like, and also arranged to be disposed in spaced relation and be driven through a differential and to operate in connection with auxiliary steering wheels as when operating as a tractor for certain types of headers and binders but principally for plows, harrows and the like.

Still another object of the invention is to provide a unit of the character described which may be made to serve as a portable power unit for the operation of grinders, shredders and other small machinery ordinarily used about farms.

These and other objects of the invention will be pointed out in detail in the following description in which reference is made to the accompanying drawings, wherein Figs. 9 and 10 are a side and front elevation of the drive unit as it appears when transformed into a tractor for operating plows, harrows and the like.

Throughout the views, the same reference numerals are applied to the same parts.

Figure 1:
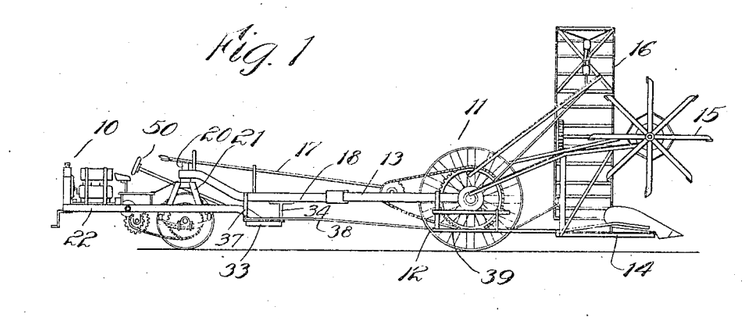
Fig. 1 is a side elevation of a header to which is coupled a power drive unit constructed and coupled with the implement in accordance with the present invention.

Referring first to Fig. 1 of the drawing, the power drive unit is designated by the reference numeral 10, and is illustrated in coupled relation with a header 11. The latter may be of any well known form and is herein illustrated as comprising the usual operating and supporting wheels 12 from between which the steering pole or tongue 13 extends rearwardly. A platform 14, upon which the grain as it is cut is laid by the reel 15, conveys the grain to the elevator 16, which in practice ordinarily empties into a header barge or upon the field in bunches when the grain must be ripened before it is gathered. The platform 14 is adapted to be elevated or lowered by the operating lever 17 in the usual manner.

The steering pole or tongue 13 in practice is usually provided at its rearward end with a trailing steering wheel running beneath a platform upon which the operator stands and guides the steering wheel by means of a tiller lever operated between his legs. In the present embodiment of my invention, I contemplate dispensing with the platform and the steering wheel and cutting off a considerable portion of the tongue and fitting the same with a coupling bar or push pole 18. The bar 18 is coextensive with the tongue 13 and has its rearward end offset upwardly and provided with a socket member 19. The socket member 19 receives a pivot post 20 carried upon the bridge portion 21 of the frame 22 of the power drive unit 10. The connection thereby provided permits of swivel movement of the drive unit with respect to the implement whereby to steer the same.

Figure 3:
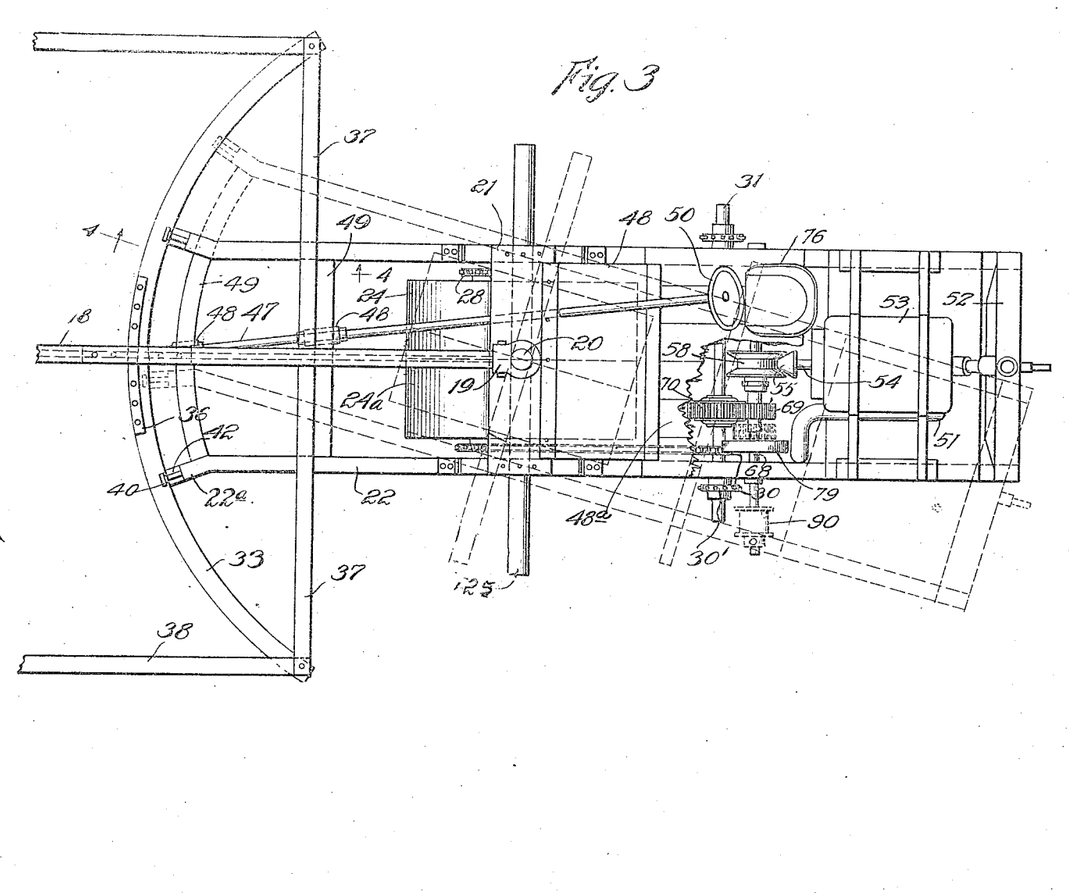
Fig. 3 is a plan view thereof as illustrated in Fig. 2.

The power drive unit is supported upon a central steering drive wheel 23 hereinafter to be designated the bull-wheel. The bull-wheel is made up of the separate drive wheels 24 and 24ª mounted upon an axle 25 common to the two wheels. The axle 25 is longitudinally removable from bearing blocks 26 fastened upon the semielliptic springs 27 at both sides of the frame 22. As appears in Fig. 3, the axle 25 carries the bull-wheel 23 in the middle and projects out a substantial distance on each side of the frame 22. As will hereinafter be described, the wheels 24 and 24ª are reversible or interchangeable and may be displaced to positions on the outside of the frame at opposite sides on the extending portions of the axle 25. When arranged side by side, as shown, the wheels 24 and 24ª are operated together so that the drive unit may swivel thereon as upon a single broad flanged wheel mounted in the middle of the frame. The drive wheels 24 and 24ª are provided with sprocket wheels 28, on which operate a pair of drive chains 29 driven by the sprocket pinions 30. The pinions 30 are rigidly secured on a counter-shaft 31 suspended in brackets 32 on the nether side of the frame 22. An auxiliary pair of sprocket pinions 30′ are provided on the counter-shaft 31 on the outside of the frame 22 at opposite sides, as illustrated in Fig. 3. This twin drive gear arrangement affords a convenient drive connection for the drive wheels in either of their two operating positions. When the drive wheels 24 and 24ª are displaced to the outside of the frame the pinions 30′ are used in transmitting power through the chains 29 to the drive wheels.

Suspended from and rigid with the coupling bar, is an arcuate T-track 33 held in spaced relation to the bar 18 by means of a bracket 34. The latter has one leg 35 lying along the under side of the bar 18, and a transverse leg 36 arcuate in form which lies along the forward upper edge of the T-track 33, both legs of the bracket being preferably riveted or otherwise permanently secured to the members with which they engage. As most clearly appears in Fig. 3, the track 33 is formed on an arc having the pivot post 20 as a center for a purpose which will presently appear. A pair of lateral struts 37 join the extremities of the T-track 33 with the coupling bar 18 and serve to lend rigidity to the track. In order to further strengthen the track, a pair of longitudinal struts 38 join the extremities of the track with the forked header frame and prevent either angular or longitudinal displacement thereof relative to the truck.

The power drive unit 10 is prevented from tilting movement on the bull-wheel 23 by the engagement of two sets of rollers 40 and 41 with the horizontal and vertical flanges, respectively, of the T-track 33. The rollers 40 are carried upon brackets 42 bolted to the upper flanges of the diverging ends 22ª of the side members of the frame 22 (see Figs. 3 and 4). The rollers 41 are supported similarly upon plates 43 bolted to the lower flanges of the diverging ends 22ª of the side members of the frame 22. By bending the frame side members as shown, binding of the rollers in operation on the track is prevented. Furthermore this enables the use of straight bolts carrying the rollers 40 and otherwise simplifies and improves the connection between the implement and the driver unit. Each individual roller is removable separately with its bolt 44 in order to permit renewal of either of these parts but primarily to permit uncoupling of the power drive unit from the header, or other implement with which it is connected. When uncoupling the driver unit, it is only necessary ordinarily to remove the upper ones of the sets of rollers 40 so that the track 33, along with the coupling bar 18, may be raised off at one time from the driver unit. The rollers 40 and 41, engaging as they do opposite adjacent edges of the track 33, support the forward end of the frame 22 against upward or longitudinal displacement relative to the track. In other words, the track serves as an abutment for the driver unit. As indicated in Fig. 3, the rollers cooperate with the track 33 to support the frame of the driver unit in all positions of angularity to which the latter may move relative to the track in the operations of steering the implement.

The T-track 33 is provided with rack teeth 45 in the lower edge of the vertical flange thereof. Engaging therewith is a bevel pinion 46 carried upon the lower end of a steering rod 47. The latter is received in a set of bearings 48 provided in cross bars 49 joining the sides of the frame 22. The steering rod 47 projects through a foot board 48 joining the bridge 21 of the frame 22 with a platform 48ᵃ on top of the frame. A steering wheel 50, provided on the end of the steering rod 47, is adapted to be turned to cause the pinion 46 to travel along the rack teeth 45 to swing the frame 22 on the bullwheel 23 as a pivot to angular or diagonal postions as illustrated in dotted lines in Fig. 3. In this way the dr'ying force transmitted through the coupling bar, which constitutes a pusher member, is applied in a direction other than on a direct line with the rear end of the coupling bar, so that the header will be swung about on its wheels 12 to m. along a new course.

Figures 4, 5, 6, 7, 8:
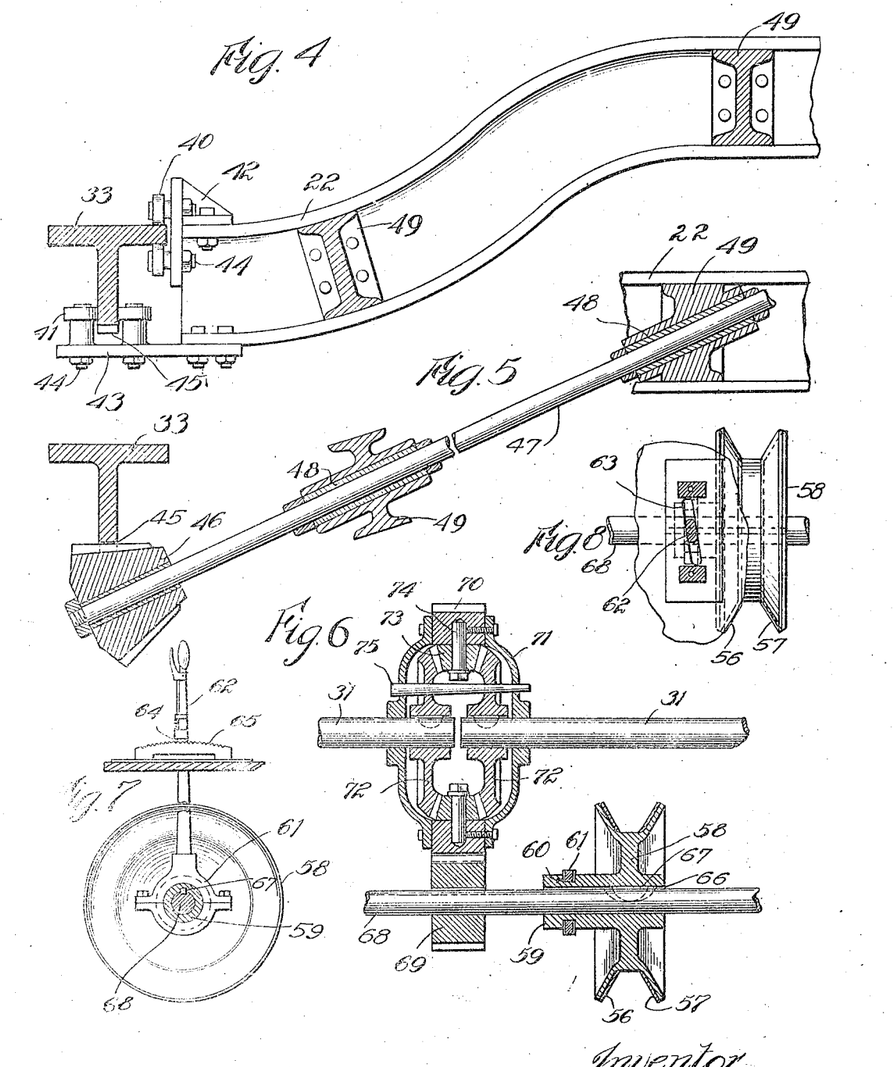
Fig. 4 is an enlarged fragmentary sectional detail illustrating the connection between the drive unit and the implem<sub>e</sub>nt and is taken on the line 4—4 of Fig. 3.
Fig. 5 is a similar detail illustrating the steering connection between the power drive unit and the implement whereby the power drive unit is made to move to angular positions relative to the implement, as illustrated in dotted lines in Fig. 3.
Fig. 6 is a sectional detail of a portion of the transmission between the engine of the driver unit and the drive wheels thereof.
Figs. 7 and 8 are respectively a vertical sectional detail and a horizontal sectional detail of the clutch forming part of the power transmission of the power drive unit whereby the latter may be operated in either direction.

Supported in any suitable manner at one end of the frame 22 is an engine 51, preferably of the internal combustion type, which has a radiator 52 and fuel tank 53 of the type commonly provided on tractors. The crank-shaft 54 of the engine 51 is fitted with a bevel driving pinion 55 adapted to engage with either of the faces 56 or 57 of a clutch sheave 58. The clutch faces 56 and 57 are preferably of fiber or other suitable wear-resisting material which may be replaced when worn. The sheave 58 has an extension hub 59 in which is formed an annular groove 60 to receive the looped yoke end 61 of a shift lever 62. The latter operates in a diagonal slot 63 and is adapted to be held in adjusted position by a spring pressed detent 64 engaging an arcuate ratchet 65 (see Fig. 7). The clutch sheave 58 has a keyway 66 provided in the hub 59 thereof, wherein a key 67 rigid with the driven shaft 68 is adapted to engage loosely, to permit longitudinal movement of the clutch sheave 58 on the drive shaft. By virtue of the diagonal slot 63, the clutch sheave 58 is made to move longitudinally of the drive shaft 68 to engage either of its faces 56 or 57 with the drive pinion 55 and consequently to cause the shaft 68 to be driven alternatively in opposite directions. When the lever 62, however, occupies an intermediate position in the slot 63, as shown in Fig. 8, neither face of the clutch sheave 58 is engaged by the pinion 55. In other words, this position is the neutral position of the lever 62.

Figure 2:
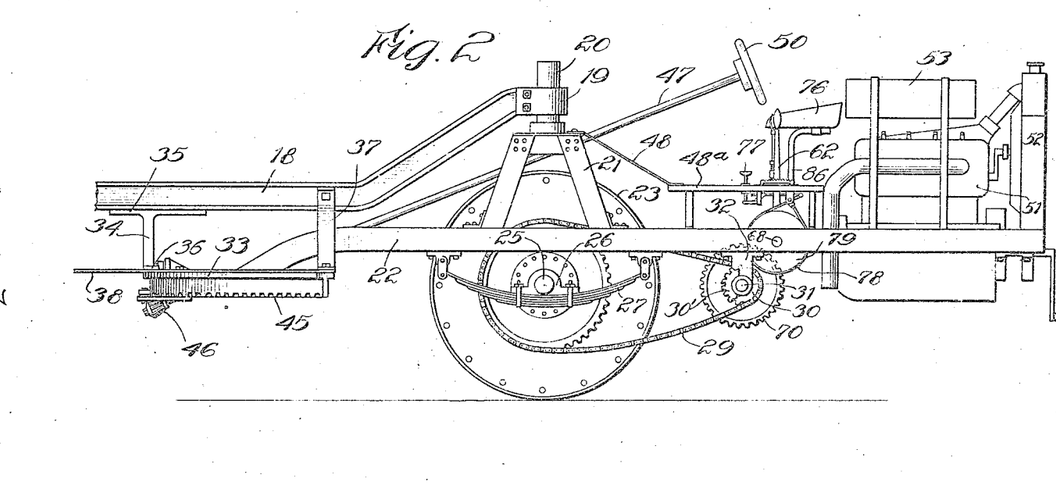
Fig. 2 is an enlarged side elevation of the power drive unit separately.

Mounted upon the driven shaft 68 is a pinion 69 meshing with a ring gear 70 forming part of a differential housing 71 on the counter-shaft 31. The counter-shaft 31, as illustrated in Fig. 6, is formed in two sections which extend into the differential housing 71 from opposite sides and are journalled therein. A pair of bevel gears 72, each of which is keyed to a section of the counter-shaft, mesh with bevel pinions 73 mounted on studs 74, extending radially inwardly from the ring gear 70. A locking pin 75, preferably tapering in form, is entered through one side of the differential housing 71 through registering holes in the bevel gears 72 and serves to lock these gears together against relative rotation. When it is desired to transmit power positively and equally to both sections of the counter-shaft 31, this pin is employed as for example, when the drive wheels 24 and 24ᵃ operate jointly as a bull-wheel in the middle of the frame 22, as illustrated in Figs. 1, 2 and 3. When the pin 75 is removed, the sections of the counter-shaft 31 are driven differentially as is necessary when the drive wheels are displaced to positions on opposite sides of the frame 22, as illustrated in Figs. 9 and 10.

The power drive unit is capable of being employed in the following manner: In coupling or uncoupling an implement from the drive unit, the upper rollers of the sets of rollers 40 are removed to permit the coupling bar 18 and the T-track 33 to be engaged with or disengaged from the pivot post 20, and the steering pinion 46 at the forward end of the drive unit, respectively. When these elements are properly correlated in coupling the unit with an implement, the rollers are secured in position and the device is ready for operation. On a straight-away course, the operator sitting on the seat 76 on the platform 48ᵃ steers by means of the steering wheel 50. The shifting lever 62 is within the operator's reach at one side so that in turning a corner or in backing around, the operator has the drive unit under easy control at all times. Braking means is preferably employed to control the binder or header when operating in hilly country and suitably comprises a pedal 77 which the operator may tread upon to vary the tension of the band 78 on the brake drum 79, mounted on the driven shaft 68. On a straight-away course little or no steering is necessary and the operator has merely to attend to elevating and lowering the platform 14 by means of the lever 17. When the end of a course is reached, the operator shifts the lever 62 through neutral position rearwardly to cause reverse movement of the power drive unit. Simultaneously with the movement of the shift lever 62 to reverse position, the operator commences to turn the steering wheel 50 and to cause the drive unit to assume a diagonal position with respect to the implement. The pinion 46 being operated along the rack 45 in either direction causes the driver unit to swing about with the pivot post 20 as a center, the arrangement being such that turning of the wheel counterclockwise, that is, to the left, causes the driver unit to swing to the right but the header to be steered to the left in an obvious manner. The driver unit having moved the implement into position to cut another swath, say at right angles to the former course, is immediately righted so as to travel behind the implement straight away, the operator having in the meantime moved the shift lever into neutral position and thereupon into forward position to cause the driver unit and implement to move forward as before. The operation of negotiating a corner, as just described, may be varied to suit conditions, as for example where it is not necessary to turn a corner sharply or squarely, as in the manner above described, it is possible to make a gradual turn simply by manipulating the steering wheel 50 to cause proper angular displacement of the driver unit. This, of course, may be done without any shifting of the lever 62, since the implement and the driver unit maintain a continual forward movement.

Figure 9:
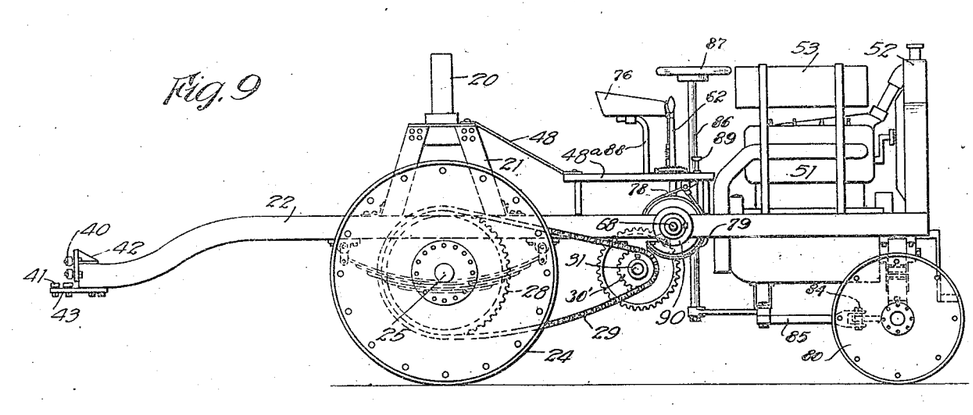
Figure 10:
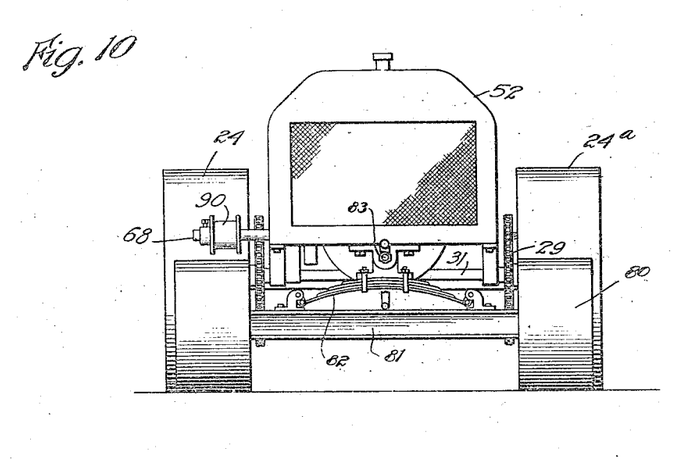

Referring now to Figs. 9 and 10, I have illustrated how I contemplate transforming the driver unit from a pusher into a tractor so as to make it available for use in drawing plows, harrows and the like. In this way, the unit can be used both in harvesting crops and in preparing the soil. When used as a tractor, the drive wheels 24 and 24ª are displaced to the outside of the frame on opposite sides and are driven from the sprocket pinions 30' on the opposite ends of the counter-shaft 31. The lock pin 75 above described is removed from the differential to secure transmission of power to the drive wheels in which differential movement of the latter is permitted. In this connection, I employ an auxiliary pair of wheels 80 to support the forward end of the tractor. These wheels are carried upon an axle 81 which is preferably removable with its semi-elliptic spring 82 by withdrawing a king bolt 83 by means of which the same is held on the under side of the tractor frame at the forward end. The wheels 80 are preferably mounted on steering knuckles on the opposite ends of the axle 81 and are steered by means of a tie bar 84 which in turn is operated through suitable levers indicated at 85, from a vertical steering rod 86. The latter carries a steering wheel 87 at its upper end to be operated by the operator sitting on the seat 76, the post 88 of which, it will be noted, when used in this connection is moved from the position illustrated in Figs. 1 and 2 to a position on the opposite side of the shift lever 62. In this connection I also employ a brake pedal 89 acting directly upon the band 78 to tighten the latter on the drum 79, the intermediate actuating linkage for the brake lever which is illustrated in Fig. 2 being dispensed with. When the unit is so reorganized the outer cross bar 49 above mentioned serves as a draft bar to which the plow or harrow may be attached.

When the driver unit is set up as a tractor, I contemplate using the same as a portable power plant and therefore provide a pulley attachment with which to operate such machines as grinders, shredders, pumps and the like which ordinarily require a separate stationary engine for their operation. This attachment consists of a pulley 90 mounted preferably on the driven shaft 68 which is extended on one side of the frame for this purpose. This pulley is readily detachable by loosening the set screw in the hub thereof. When the pulley is employed, the pinion 69 must be moved to the dotted line position shown in Fig. 3, out of mesh with the differential ring gear 70 so that power is not transmitted to the driver wheels 24 and 24ª. When so connected, the pulley 90 may, of course, be driven in opposite directions by proper manipulation of the shift lever 62.

From the foregoing description, it will appear that I have provided a power drive unit for agricultural implements capable of varied use by the farmer, which is particularly adapted for the operation of push operated implements such as headers, binders and the like, and which suitably may be used for drawing plows, harrows and the like, and further, to operate small machines such as shredders, pumps and the like, and that the reorganization of the unit necessary to adapt the same to its varied uses may be done with considerable facility. I am aware that the invention, as herein described, is capable of considerable adaptation and modification to still partake of the more important advantages of my invention. In the accompanying claims it is, therefore, the endeavor to include any such legitimate modifications as would occur to one skilled in the art to which the invention relates.

I claim as my invention:

1. The combination with a push operated implement having a rearwardly extending tongue, of a pusher frame, pivotally connected to said tongue, a single wheel between the sides of said frame to support the same for swivel movement, means on said frame to drive said wheel, and means between said frame and said implement for steadying the frame.

2. The combination with a push operated implement having a rearwardly extending tongue, of a pusher frame pivotally connected to said tongue, a single wheel between the sides of said frame to support the same for swivel movement, means on said frame to drive said wheel, and means between said frame and implement for swinging the frame on said wheel to diagonal positions relative to said implement 3. The combination in a push operated implement having a rearwardly extending tongue, of a pusher frame pivotally connected to said tongue, a single wheel between the sides of said frame to support the same for swivel movement, means on said frame to drive said wheel, means between said frame and said implement for swinging the frame on said wheel to diagonal positions relative to said implement, and transmission means between said driving means and said wheel for turning the latter alternatively in opposite directions.

4. The combination of a push operated implement having a rearwardly extending tongue, of a pusher frame, a single steering wheel mounted between the sides of said frame and arranged to support the same for swivel movement, means on said frame for driving said wheel, means between said frame and said implement for swinging said frame on said wheel to diagonal positions relative to said implement, and means forming a pivotal connection for said tongue with said frame above said steering wheel coaxial relative to the vertical axis of the wheel upon which the latter swivels.

5. The combination of a push operated implement, means for pushing and steering said implement comprising a pusher unit, a pusher member pivotally supported upon said pusher extending forwardly and connected to said implement, said pusher unit comprising a central power-operated steering wheel in the pusher frame, said frame being swingable upon said wheel as a pivot to steer said implement, an abutment carried by said pusher member for supporting one end of said frame against tilting throughout the range of its movements, and means acting between said frame and said abutment to adjust the position of said frame on said abutment in steering said implement.

6. The combination of a two-wheeled push operated implement having a rearwardly extending tongue, and a one-wheeled follower for pushing and steering said implement, said follower being adapted to serve as a support for the rear end of said tongue, and means controlled from the follower and operating between said follower and said tongue to cause relative deflection between said follower and said implement sidewise from their former common path of travel to steer said implement.

7. The combination with a push operated implement comprising forward operating and supporting wheels and a rearwardly extending tongue cut off in back of said implement, of means for pushing and steering said implement while balancing the same against tilting, comprising a separable pusher attachment, a pusher member pivotally supported upon said pusher and extending forwardly for permanent connection with the cut off end of said tongue, said pusher member being removable from said pusher, and said pusher comprising a frame supported centrally thereof and adapted to swing upon its support as a pivot in steering said implement, an abutment carried by said pusher member adapted to be removably engaged by one end of the pusher frame, and steering means permanently associated with said pusher adapted to engage said abutment to move the end of said frame on said abutment in steering said implement.

8. The combination of an implement having an outwardly extending tongue, a coupling member mounted on said tongue, a driver unit pivotally supporting the end of said coupling member, and means between said coupling member and said driver unit for moving said driver unit angularly with respect to said member to steer said implement, said means comprising a track member carried by said coupling member in front of said driver unit, said track member being bent in the form of an arc struck with a point to the rear of said implement as a center, said point being coincident with the end of said coupling bar, and said driver unit having a one-piece support coincident with the end of said bar whereby to swivel beneath the latter, rack teeth provided on said track, a pinion carried by said driver unit adapted to engage therewith, and means for operating said pinion along said rack to move the end of said driver unit out of alinement with said coupling bar whereby to steer said implement.

9. In an implement of the character described having a tongue extending therefrom, a driver unit for operating said implement, a coupling bar having rigid connection with said implement and swivel supported on said driver unit, said driver unit having a one-point support coincident with the end of said coupling bar whereby the same is capable of pivotal movement beneath said bar to angular positions relative thereto in steering said implement, an arcuate track mounted on said coupling bar in front of said driver unit, said track being struck on an arc having its center coincident with the pivotal connection between said coupling bar and said driver unit, said track being substantially T-shaped in cross section, means between the forward horizontal flange of said track and said coupling bar for fastening the two together, said track having rack teeth formed in the vertical flange thereof, a pinion carried in the forward end of said driver unit adapted to engage with said rack teeth, means for operating said pinion to travel along said rack teeth to displace the end of said driver unit sidewise out of alinement with said coupling bar to steer said implement, and abutment means on said driver unit for engaging the upper and lower sides of the rearward horizontal flange of said track to support said driver unit against tilting.

10. The combination with a two wheeled push operated implement having a rearwardly extending operating tongue, of a power driver unit for operating said unit by pushing the same having pivotal connection with said operating tongue, said driver comprising a pair of drive wheels adapted to be placed side by side in the driver frame to be operated simultaneously as a single wheel to support said driver for swivel movement to diagonal positions relative to said tongue whereby to steer said implement, said drive wheels being arranged to be displaced to the sides of said driver to be operated differentially.

11. A power pusher or tractor unit for operating and steering agricultural implements comprising a frame, a pair of driving wheels adapted to be placed side by side to constitute in effect a single wheel in the middle of said frame, means for transmitting power to said wheels, said frame being adapted to swivel thereon whereby to become diagonally displaced with respect to an implement being operated thereby whereby the latter may be steered, means pivotally connected to said frame directly over said drive wheels arranged for rigid connection with an implement to be operated, and means on one end of said frame adapted to be supported by the implement to prevent tilting of said unit relative to the implement.

12. A power pusher or tractor unit for operating agricultural implements, comprising a frame, an engine supported thereby, a pair of drive wheels for said frame, an axle for said wheels extending from opposite sides of said frame, said drive wheels being adapted to be placed side by side on said axle in the middle of said frame to constitute a single steering wheel whereon said frame is capable of swivel movement and said wheels being adapted to be displaced to the outside of said frame on the extending portions of said axle to operate as supporting drive wheels, a pair of auxiliary wheels adapted to be removably mounted on one end of said frame, and transmission mechanism between said engine and said drive wheels for operating said wheels together as one wheel to move forward or backward or to operate said wheels differentially to move forward or backward.

13. A power pusher or tractor unit for operating agricultural implements, comprising a frame, an engine supported thereby, a pair of drive wheels for said frame, an axle for said wheels extending from opposite sides of said frame, said drive wheels being adapted to be placed side by side on said axle in the middle of said frame and to be displaced to the outside of said frame on the extending portions of said axle, a pair of auxiliary wheels mounted on one end of said frame, and transmission mechanism between said engine and said drive wheels for operating said wheels together as one wheel to move forward or backward or to operate said wheels differentially to move forward or backward.

14. A power pusher or tractor unit for operating agricultural implements, comprising a frame, an engine supported thereby, a pair of drive wheels for said frame, an axle for said wheels extending from opposite sides of said frame, said drive wheels being adapted to be placed side by side on said axle in the middle of said frame and to be displaced to the outside of said frame on the extending portions of said axle, and transmission mechanism between said engine and said drive wheels for operating said wheels together as one wheel to move forward or backward or to operate said wheels differentially to move forward or backward.

15. A power pusher or tractor unit for operating agricultural implements, comprising a frame, an engine supported thereby, a pair of drive wheels for said frame arranged on the opposite sides thereof, an axle for said wheels extending from opposite sides of said frame, said drive wheels being adapted to be placed side by side in the middle of said frame to constitute a single steering wheel whereon said frame is capable of swivel movement, a pair of auxiliary wheels mounted on one end of said frame, and transmission mechanism between said engine and said drive wheels for operating said wheels together as one wheel to move forward or backward when the same are side by side or to operate said wheels differentially to move forward or backward when the same are separated.

16. A power pusher or tractor unit of the character described comprising a frame, an axle mounted thereon, a pair of drive wheels on said axle, driving means for said wheels carried by said frame, transmission means between said wheels and said driving means to transmit power to the wheels including a two section shaft, a differential for transmitting power from said driving means to said sections, each of said sections being used to operate one of said drive wheels, and twin driving gear for each of said sections for driving said wheels, said wheels being arranged either to be placed side by side in the middle of said frame to operate together and be driven from one set of driving gear on said shaft sections or to be placed apart at the sides of said frame and be driven from the other set of driving gear on said shaft sections.

17. A power pusher or tractor unit of the character described comprising a frame, an axle mounted thereon, a pair of drive wheels on said axle, driving means for said wheels carried by said frame, transmission means between said wheels and said driving means to transmit power to the wheels including a two section shaft, a differential for transmitting power from said driving means to said sections arranged either to drive the sections together as one or individually but differentially, each of said sections being used to operate one of said drive wheels, and twin driving gear on each of said sections for driving said wheels, said wheels being arranged either to be placed side by side in the middle of said frame to operate together and be driven from one set of driving gear on said shaft sections or to be placed apart at the sides of said frame and be driven from the other set of driving gear on said shaft sections.

18. A power pusher or tractor unit of the character described comprising a frame, an axle mounted thereon, a pair of drive wheels on said axle, driving means for said wheels carried by said frame, transmission means between said wheels and said driving means to transmit power to the wheels including a two section shaft, a differential for transmitting power from said driving means to said sections arranged either to drive the sections together as one or individually but differentially, a reversing clutch between said differential and said driving means to operate the former in reverse directions, each of said sections being used to operate one of said drive wheels, and twin driving gear on each of said sections, for driving said wheels, said wheels being arranged either to be placed side by side in the middle of said frame to operate together and be driven from one set of driving gear on said shaft sections or to be placed apart at the sides of said frame and be driven from the other set of driving gear on said shaft sections.

19. A power pusher or tractor unit of the character described comprising a frame, an axle mounted thereon, a pair of drive wheels on said axle, driving means for said wheels carried by said frame, transmission means between said wheels and said driving means to transmit power to the wheels including a two section shaft, a differential for transmitting power from said driving means to said sections, a reversing clutch between said differential and said driving means to operate the former in reverse directions, each of said sections being used to operate one of said drive wheels, and twin driving gear on each of said sections for driving said wheels, said wheels being arranged either to be placed side by side in the middle of said frame to operate together and be driven from one set of driving gear on said shaft sections or to be placed apart at the sides of said frame and be driven from the other set of driving gear on said shaft sections.

20. The combination of a push operated implement having a rearwardly directed operating tongue, and a swiveling driver unit arranged to operate as a pusher, of a coupler bar adapted to be fastened upon said tongue and extended for connection with said driver rearwardly and over the driver with the end of the said bar in co-axial alinement relative to the axis on which the driver swivels, a socket provided in one of said connecting members and a post to fit said socket provided on the other of the said members whereby a detachable, swiveling operating connection is afforded for said member arranged to be severed by the raising of said bar relative to said driver, an arcuate T-track suspended from said bar and arranged to be braced from and thereby rendered rigid with said implement, means carried by said driver for detachably engaging said track to move the end of said driver therealong in steering said implement, and means carried by said driver to removably engage said T track to sustain the end of said driver thereon while said driver is arranged in associated relation with said implement.

21. The combination with a two-wheeled push operated implement, of a driven unit having a front steering wheel and rear driving wheels at the sides thereof, the said front steering wheel being removable from said unit, and the said rear driving wheels being displaceable from the sides of said unit to the middle thereof to constitute in effect a single wheel whereon the unit may swivel in operation, and means to provide a detachable pivotal connection with said implement.

22. The combination with a two-wheeled push operated implement, of a driven unit having a front steering wheel and rear driving wheels, at the sides thereof, the said front steering wheel being removable from said unit, and the said rear driving wheels being displaceable from the sides of said unit to the middle thereof to constitute in effect a single wheel whereon the unit may swivel in operation, means to provide a detachable pivotal connection with said implement, and means on said unit for operating said driving wheels arranged to operate the same differentially when disposed at the sides of said unit but together at the same rate when displaced to the middle of said unit.

23. The combination with a two-wheeled push operated implement, of a driven unit having a front steering wheel and rear driving wheels at the sides thereof, the said front steering wheel being removable from said unit, and the said rear driving wheels being displaceable from the sides of said unit to the middle thereof to constitute in effect a single wheel whereon the unit may swivel in operation, means to provide a detachable pivotal connection with said implement, means on said unit for operating said driving wheels arranged to operate the same differentially when disposed at the sides of said unit but together at the same rate when displaced to the middle of said unit, an engine carried by said unit arranged to transmit power to said means, and a reversing clutch between said engine and said means for operating the latter in reverse directions whereby said drive wheels are operable in reverse directions either when operated differentially or together at the same speed.

24. A power unit of the character described comprising a frame having an operating engine mounted thereon, an axle extending transversely in said frame, a wheel for supporting driving and steering said frame arranged between the sides thereof on said axle to provide in effect a swivel support for the frame, said frame having a bridge portion overlying said wheel to form a support for one element of a detachable pivotal connection coaxial relative to the vertical axis of said wheel whereon the latter swivels, a coupling bar connector for the implement to be operated by said unit arranged to overlie said bridge portion and having the complementary element of the aforesaid pivotal connection whereby to provide a detachable swinging connection with said unit to permit steering movements of the latter relative to the implement being operated.

25. A power unit of the character described comprising a frame having an operating engine mounted on one end thereof, an axle extending transversely in said frame intermediate the ends thereof, a wheel for supporting driving and steering said frame arranged between the sides of said frame on said axle to provide in effect a swivel support for the frame, a bridge portion on said frame overlying said steering wheel having a post extending therefrom forming one element of a detachable pivotal connection coaxial relative to the vertical axis of said wheel whereon the latter swivels, a coupling bar connector arranged to be connected to said unit and having an end overlying said bridge portion and arranged to receive said pivot post to provide a pivotal connection with said unit to permit swinging of the latter in the steering of the implement being operated, and combined supporting and steering means at the end of said frame opposite said engine between said connector bar and said frame whereby the latter is supported and may be swung relative to said bar.

In testimony whereof, I have hereunto affixed my signature.

HERMAN L. SCHNEIDER.